United States Patent [19]

Ernest et al.

[11] 4,310,451

[45] Jan. 12, 1982

[54] FREE FLOWING RIGID PVC RESIN POWDER COMPOSITIONS

[75] Inventors: Gerald W. Ernest, Willowick; James R. DeFife, Mentor, both of Ohio

[73] Assignee: Diamond Shamrock Plastics Corporation, Dallas, Tex.

[21] Appl. No.: 88,120

[22] Filed: Oct. 25, 1979

[51] Int. Cl.³ .............................................. C08K 5/05
[52] U.S. Cl. ................................................ 260/34.2
[58] Field of Search ..................................... 260/34.2

[56] References Cited

U.S. PATENT DOCUMENTS 2,530,852 11/1950 Bixby ................................ 260/34.2
3,882,074 5/1975 Settembrini ...................... 260/34.2
4,116,908 9/1978 Emery .............................. 260/34.2
4,119,601 10/1978 Bonnaud et al. ................. 260/34.2

OTHER PUBLICATIONS

Chemical Abstracts, vol. 81, 1974, Entry 78852w.
Chemical Abstracts, vol. 78, 1973, Entry 4904f.

*Primary Examiner*—William F. Hamrock
*Assistant Examiner*—Peter F. Kulkosky
*Attorney, Agent, or Firm*—Helen P. Brush

[57] ABSTRACT

The free-flow characteristics and processing performance of filled, rigid powder compositions of mass-polymerized PVC resin are improved by incorporating a minor quantity of glycerin into the formulation during the blending operation, said quantity of glycerin ranging from about 0.1 part to 0.5 part per 100 parts of resin, by weight.

7 Claims, No Drawings

FREE FLOWING RIGID PVC RESIN POWDER COMPOSITIONS

BACKGROUND OF THE INVENTION

The present invention relates to rigid PVC resin powder compositions adapted for the fabrication of pipe and other extruded articles, conduit, and more particularly relates to rigid PVC resin powder compositions of improved free-flow characteristics and processing performance which are prepared from bulk- or mass-polymerized PVC resin.

As known in the art, the manufacture of PVC resin in mass, as opposed to that prepared via aqueous suspension or emulsion techniques, is conducted in the absence of solvents, diluents and additives other than catalysts. "In mass" is synonomous in meaning to the term "in bulk." Polymerization processes in mass or bulk which are commercially practiced on a large scale at present are autoclave processes, it being advantageous in most instances to carry out the process with the vinyl chloride monomer in the liquid phase and vinyl chloride is a gas at ordinary temperatures. These liquid-phase processes normally are conducted in two stages beginning with a homogeneous liquid medium of very low viscosity, which medium is gradually converted to an essentially solid phase with increasing monomer conversion. Liquid phase bulk polymerization processes are described, for example, in U.S. Pat. Nos. 3,522,227; 3,535,298; 3,539,544; and 3,759,885; among others.

Mass-polymerized PVC resin is generally reputed to be of greater purity than that made by either a suspension or emulsion process since no suspending agent or emulsifier is incorporated in the polymerization mixture. In compounding, it is oftentimes advantageous to use mass-polymerized PVC rather than suspension-polymerized material, since the higher bulk density of the mass PVC allows for larger resin charge sizes per mixing cycle thus providing reduced compounding time overall. Also, the higher bulk density of the resin and its more uniform particle structure provide faster extrusion rates for its compounds. However, when mass-polymerized PVC is employed in the preparation of highly filled powder compositions, particularly rigid formulations, caking of material on the walls of the mixer and/or of the cooling chamber has consistently occurred. This buildup has, of course, lengthened mixing cycles, slowing down compounding significantly. Finally, when filled powder compositions of bulk-polymerized PVC have been extruded to finished plastic articles, the compositions are not free flowing and buildup of the composition on the auger feed screw has developed, making it necessary to continually increase the screw speed. Eventually, total loss of feed has occurred and operations have been halted to clean the equipment.

SUMMARY OF THE INVENTION

Accordingly, it is the object of this invention to provide a highly filled, rigid powder composition from bulk-polymerized PVC resin in normal mixing cycles, which composition will be essentially free flowing when extruded to finished plastic shapes such as pipe and conduit.

It is another object of this invention to provide a highly filled, rigid powder composition from bulk-polymerized PVC resin which will not substantially agglomerate and buildup on the walls of the mixer or of the cooling chamber during preparation.

It is still a further object of this invention to provide a method for preparing a highly filled, rigid powder composition from bulk-polymerized PVC resin which will be essentially free flowing both during preparation, and in subsequent processing.

These and other objects are accomplished herein by incorporating a minor quantity of glycerin into the bulk-polymerized PVC resin formulation during blending, said quantity of glycerin ranging from about 0.1 part to 0.5 part per each 100 parts of the bulk-polymerized resin. The composition prepared is found to exhibit satisfactory free-flow characteristics, being easily removed from the mixing chamber. Upon being extruded, the material does not hang up on the feed screw. It may be processed at commercially acceptable rates to provide rigid shaped articles of excellent quality and improved properties, particularly impact strength.

DESCRIPTION OF THE PREFERRED EMBODIMENTS

As may be used herein in the specification and claims, the terms "rigid PVC resin powder composition," "rigid PVC powder composition" or "rigid PVC powder compound" are each intended to refer to those compositions wherein a poly(vinyl chloride) resin prepared by a bulk- or mass-type polymerization process is an intimate physical admixture with minor quantities of various compounding ingredients as described hereinafter. In practice herein, these compounding ingredients do not usually include organic liquids which are designated in the art as plasticizers. However, for some specialized applications, the rigid resin compound may contain minor quantities of organic liquid plasticizers, such quantity not exceeding 10 percent based on the weight of the composition, so as not to degrade the strength and resistance properties of the resin. It is to be understood, therefore, that a rigid PVC resin powder composition which contains up to 10 percent, by weight, of an organic liquid plasticizer, although not regularly employed in practice herein, is within the scope of the present invention.

As indicated previously herein, the present invention encompasses a powder composition or compound containing bulk-polymerized PVC resin, which composition is useful for the fabrication of extruded rigid shapes such as pipe and conduit, and to the method for preparing this material so that it does not significantly agglomerate or cake up either in the mixing equipment or during subsequent processing. This composition or compound is an intimate physical blend of a major amount of a mass-polymerized PVC, and a minor amount each of stabilizer, lubricant, filler or extender and pigment. In some instances, the composition may further incorporate a processing aid and/or impact modifier, and other compounding ingredients as are conventionally known and now used in the art. The mixing apparatus employed is a high-shear, jacketed mixer equipped with high-speed agitation means whereby the charged ingredients can be rapidly recirculated by centrifugal action or other similar force at high velocity with intensive particle-to-particle and particle-to-metal impingement. In this manner, heat energy thus is developed and generated within the blending material by friction. As a rule, no external heat is applied to the blending ingredients in the mixer, the necessary heat being developed completely within the blend by friction. External heat may be applied to the blending ingredients through the mixer jacket, however, without departing from the scope of this invention.

Any high-shear, high-speed mixer which is commercially available at present may be suitably employed to prepare the rigid PVC resin powder composition of this invention. Suitable commercial high-speed mixers include, for example, the "Henschel Fluid Mixer" (Purnell, Inc., Houston, Tex.), the "Papenmeier/Welex Universal Dry Mixers" (distributed in the U.S. by Welex, Inc., Division of Welding Engineers, Inc., Blue Bell, Pa.), and the "Littleford High Speed Mixer" (manufactured by Littleford Brothers, Inc., Florence, Ky.).

The PVC resins utilized herein are prepared by bulk or mass polymerization, i.e., without using water as the monomer-dispersing medium, as described in the aforementioned U.S. patents. For the greatest ease of operation and the most consistent results, these resins are presently prepared in a two-stage process. With a two-stage process, problems in stirring the reaction mixture which develop with increasing polymer formation are more easily controlled. Likewise, the heat of polymerization is more uniformly removed so as to avoid localized overheating and excessive polymer agglomeration. In the first stage of the process, a vertical autoclave typically is employed with a high-speed agitator. After the initial polymerization has been completed, i.e., a monomer conversion of up to about 10 percent is provided, the dispersion of polymer in monomer is transferred to a horizontal autoclave fitted with a ribbon blender-type blade. Additional initiator and monomer are then introduced and the polymerization is completed. Upon completion of the reaction, any remaining vinyl chloride monomer is removed and the polymer is sieved and pulverized to break up agglomerates.

The particular resins utilized herein have an inherent viscosity ranging, in general, from about 0.7 to 1.0 and a bulk density ranging from about 0.50 gram/cc to about 0.62 gram/cc. Inherent viscosity is determined at 30° C. according to ASTM D 1243-60 (Method A), employing a 0.2 percent solution of the polymer in cyclohexanone. They further have a comparatively narrow particle size distribution, from 85 to 95 percent of the particles being retained on 100 and 140 mesh sieves. The mean particle size of these resins, typically, is 125-150 microns.

Surprisingly, by use of glycerin, the filled rigid PVC powder composition obtained exhibits essentially free-flowing, noncaking characteristics. This property has not heretofore been consistently attained when preparing and fabricating filled powder compositions of mass-polymerized PVC. Glycerin, of course, has been previously known as an antistatic agent. However, the mechanism of its effectiveness in the present invention appears to be due to some other phenomenon not completely understood at present since the use of several other known and proven antistats do not provide free-flowing character to the resultant filled PVC compound.

Other compounding ingredients which normally are included in the filled rigid resin powder composition of this invention are the heat stabilizer for the resin, lubricant, filler and pigment. Stabilizers which are generally suitable include metallic soaps, e.g., the stearates, laurates, recinoleates of calcium, barium, lead, magnesium, etc.; alkyl tin salts; organic metal compounds which contain at least one metal-S linkage, e.g., tin mercaptides, or the thioglycollates of tin or antimony, including the reverse ester mercaptides thereof; and organic esters or salts containing complexed metals such as barium, cadmium, calcium, antimony or zinc. The stabilizer will be employed in amounts ranging from about 0.2 to 3.0 percent, by weight, of the resin. Lubricants, i.e., materials for providing antisticking and die-releasing properties to the composition during processing, which are suitable include monobasic fatty acids containing from about 12-18 carbons per molecule, metallic salts of such monobasic fatty acids, and their ester waxes and partially saponified ester waxes; and various naturally occurring and synthetic hydrocarbon derivatives, such as, for example, low molecular weight polyethylene, oxidized polyethylene, waxes and mineral oils. The lubricant usually is employed in an amount ranging from 0.1 to 5.0 percent, by weight, of the resin. Presently promoted and used are stabilizer-lubricant blends which are incorporated into the resin in one application. A typical such system could include, for example, an organic metal compound, a metallic soap and/or a naturally occurring hydrocarbon derivative as a high molecular weight paraffin wax.

It is to be noted that because of the mass-polymerized PVC's purity compared to suspension PVC, it is oftentimes possible to use less stabilizer than necessary heretofore to impart satisfactory heat and slight stability to articles fabricated therefrom. Thus, use of the mass-polymerized PVC composition of this invention represents a further saving to the fabricator.

Fillers which are suitable include calcium carbonate or calcium silicate. Employed to provide improvements in impact strength and stiffness properties to the finished pipe or conduit and also for economic considerations, filler materials generally may be employed in amounts ranging from about 2-35 parts per 100 parts resin, by weight. From about 5-25 parts filler per 100 parts resin, by weight, are preferably employed in present practice as vastly improved impact properties of the product are attained with these concentrations.

Pigments such as titanium dioxide, carbon black and the like, generally used for their opacifying properties, are employed in amounts ranging from about 0.1-3.0 parts per 100 parts of resin, by weight.

Compounds which are of resinous composition sometimes may be advantageously incorporated into the blended resin as processing aids therefor, serving to improve the hot melt properties of the composition particularly if processed at high-shear rates. Although not normally included, it is to be understood that use of such resinous compounds is within the scope of this invention. Suitable such resinous compounds include, e.g., various copolymers, interpolymers of alkyl esters of acrylic and methacrylic acids and poly(alphamethylstyrene). If employed, processing aid components normally will be used in an amount ranging from 0.25 to about 5.0 parts per each 100 parts of resin, by weight.

As pointed out previously herein, the rigid PVC resin powder composition of this invention is prepared preferably in a high-shear mixer equipped with high-speed agitation means. The compounded ingredients are blended to a maximum mix temperature ranging generally from 210°-280° F. and preferably from 220°-250° F. In preparing the composition, the sequence in which the additives are blended with the resin is not especially critical and normally may be accomplished in any convenient manner. However, for optimum results with minimum mixer buildup, it is presently preferred to charge the resin and glycerin initially to the mixer, adding the filler when the temperature of the mix reaches approximately 120°–130° F., then adding the stabilizing-lubricating components at a mix temperature of 170°–190° F., and finally removing the blended material from the mixer at a temperature of 220°–250° F.

In practice of this invention, only a minor portion of glycerin, by weight of the resin, will impart the desired free-flow characteristics to the mass-polymerized PVC powder composition in fast mixing cycles with no wall buildup. As stated earlier herein, this quantity ranges generally from about 0.1 part to 0.5 part glycerin per each 100 parts of resin, by weight. The glycerin may be incorporated undiluted or it may be diluted with equal parts of water, by weight. Thus, a maximum amount of 1.0 part of a 50 percent aqueous solution of glycerin will be employed per 100 parts resin, by weight.

The rigid resin powder compositions within the scope of this invention are those which contain filler since such compositions agglomerate and cake up during preparation and/or processing. Normally, no buildup problems are observed in unfilled rigid powder compositions of mass-polymerized PVC. In contrast to the minor amounts of fluffy, easily broken up agglomerates observed in those compositions which incorporate suspension polymerized PVC, the significant buildup, i.e., 20 percent or more of the formulation, which develops in filled compositions of mass-polymerized PVC is crusty and hard and cannot easily be broken up into useable material. It has been determined that the composition of such hard agglomerates is predominantly the filler compound.

The efficiency of glycerin in inhibiting buildup of the filled rigid PVC compositions according to this invention is believed singular and somewhat surprising in view of the fact that a significant mixer buildup has been observed in similar compositions of mass-polymerized PVC wherein other known antistats have been incorporated.

The filled rigid PVC powder compositions according to this invention, have essentially free-flowing properties, may be processed at much faster rates than heretofore known and used rigid powder compositions of mass-polymerized PVC. They are well adapted to satisfactory processing in either single- or multi-screw extruders. Typical products prepared include DWV pipe, sewer pipe, irrigation pipe, potable water pipe, ducting and conduit and various profiles such as, e.g., cabinet trims, window track, handrail covers, etc.

In order that those skilled in the art may more completely understand the present invention and the preferred methods by which the same may be carried into effect, the following specific examples are offered. In these examples and elsewhere herein where proportions of ingredients may be described in parts, such proportions are by weight.

EXAMPLE 1

A conventional filled, rigid PVC resin powder composition was blended in a Papenmeier mixer (Model TGHK8) with a total capacity of 2.3 kilograms. The mass-polymerized PVC employed had a bulk density of 0.59 g/cc and an inherent viscosity of 0.88. The formulation blended was as follows:

|  | Parts/wt. |
|---|---|
| PVC[1] | 100.0 |
| Lubricating stabilizer[2] | 2.1 |
| Calcium carbonate | 25.0 |
| Titanium dioxide | 1.0 |

[1]Goodyear BK-75 resin.
[2]ADVASTAB LS-202, manufactured by Cincinnati Milacron Chemicals, Reading, Ohio.

The resin was charged to the mixer at room temperature and the mixing cycle started. When the resin temperature reached 170° F., the lubricating stabilizer system was added, followed by the calcium carbonate and titanium dioxide components when the blending material reached a temperature of 210° F. The composition was discharged into the cooling chamber upon reaching a temperature of 240° F. This composition is identified hereinbelow as Example 1A.

Examination showed hard, crusty material adhered on the walls, blades and baffle of the mixer. This material was scraped off with difficulty, collected and weighed. It constituted approximately 20 percent of the total composition, by weight.

For comparison, another PVC powder compound was similarly prepared, employing the same formulation, except that a suspension polymerized PVC rather than the mass resin was employed. This resin had a bulk density of 0.50 g/cc and a relative viscosity of 2.36. Upon completion of the mixing cycle, the blended material was discharged into the cooling chamber. This composition is identified hereinbelow as Example 1B. Only about 4 weight percent of the total composition was found adhering to the mixer walls. This material was light and fluffy and could be removed easily.

Each formulation was then blended in a Papenmeier mixer (Model TSHK) with a capacity of 136.2 kilograms. The same mixing sequence as outlined above was followed, the discharge temperature being 240° F.

Examination of the mixer after blending the mass PVC formulation showed a significant quantity of crusty buildup on the mixer walls, blades and baffle. Also, a crusty buildup of material was observed on the walls of the cooler. There was no buildup of material upon mixing the suspension PVC formulation.

Each formulation was then extruded on a Cincinnati Milacron A2/80 twin-screw extruder into 5 cm Schedule 40 pipe. The extrusion temperatures (Zones 1–9) ranged from 350°–410° F. Results are as follows:

TABLE 1

| Example | 1A | 1B |
|---|---|---|
| Screw RPM | 16 | 16 |
| Screw Amps | 27 | 22 |
| Feeder RPM | 670 | 640 |
| Rate, Kilograms/hr | 91.7 | 107.2 |
| Pipe Appearance | Pitted Inside Diameter | Good |
| Impact, ft., 72° F. 4 lb. B Tup | 4 | 4 |
| Processing Behavior |  |  |
| Hopper Flow | Rat-Holing | Good |
| Auger Buildup | Yes | No |

These results indicate that by comparison to the suspension PVC formulation, the mass PVC formulation feeds unsatisfactorily, processes at a much lower rate and provides commercially unacceptable product.

EXAMPLE 2

A highly filled, rigid mass-polymerized resin powder composition according to this invention was prepared in the Papenmeier mixer according to the procedure outlined above, using the following formulation:

|  | Parts/wt. |
| --- | --- |
| PVC[1] | 100.0 |
| LS-202[2] | 2.1 |
| Calcium carbonate | 25.0 |
| Titanium dioxide | 1.0 |
| Glycerin | 0.5 |

[1]Rhone-Poulenc GB-1150 resin (inherent viscosity = 0.865; bulk density = 0.573 g/cc).
[2]As described previously.

Upon attaining a temperature of 240° F., the blended composition was discharged from the mixer into the cooling chamber. The material observed on the mixer walls was removed easily. It comprised about 6 weight percent of the total composition. This quantity of buildup is significantly less than that observed in preparing a mass-polymerized resin composition without glycerin as set forth in Example 1.

EXAMPLE 3

A rigid powder composition of mass-polymerized PVC was prepared following the procedure and formulation of Example 1 but incorporating only 2.5 parts of calcium carbonate filler per 100 parts of resin, by weight. After discharging the blended composition into the cooling chamber, a significant quantity thereof was retained in the mixer, adhered both on the walls and on the mixer blades. This material, which was partially light in texture and partially hard and crusty, was found to constitute approximately 22 percent of the total composition weight. Thus, a powder composition of mass-polymerized resin, even with a low filler level, exhibits significant buildup in preparation if no glycerin is employed.

EXAMPLES 4-10

Following the blending procedure as outlined in Example 1 above, a series of powder compositions were prepared. The formulation of Example 2 was followed except that proven antistat compounds as listed in the table below were employed instead of glycerin. Each of these compositions was discharged into the cooling chamber upon reaching a temperature of 240° F., and the percentage of said compositions retained in the mixer was then determined by weighing. Using this procedure, results are as follows:

TABLE 2

| Example | Compound Additive | 100 parts resin | Mixer Buildup % |
| --- | --- | --- | --- |
| 4 | Glyceryl monostearate | 0.3 | 20 |
| 5 | Carbon black | 0.5 | 21 |
| 6 | Calcium stearate | 0.4 | 22 |
| 7 | Aluminum oxide "C"[1] | 0.5 | 19 |
| 8 | AEROSIL 200[2] | 0.5 | 22 |
| 9 | AEROSIL 962[2] | 0.5 | 20 |
| 10 | CYASTAT[3] | 0.5 | 5[4] |

[1]Alumina, manufactured by DeGussa, Inc., Pigments Div., Teterboro, New Jersey
[2]Pyrogenic silica, manufactured by DeGussa, Inc., Pigments Div., Teterboro, New Jersey
[3]Quaternary amine antistat, manufactured by American Cyanamid Co., Polymer and Chemicals Dept., Bound Brook, New Jersey
[4]Although mixer buildup was slight, extruded articles from this composition were yellowed with an impact strength at 72° F. of 3.0 feet (4 lb. Tup).

EXAMPLE 11

The composition of Example 2 (that containing 0.5 part glycerin per 100 parts resin, by weight) and the composition of Example 10 (containing 0.5 part Cyastat per 100 parts resin, by weight) were each extruded in a CMA-280 extruder to prepare 5 cm Schedule 40 pipe with the following results:

TABLE 3

| Additive | 0.5 part Glycerin | 0.5 part Cyastat |
| --- | --- | --- |
| Screw RPM | 16 | 16 |
| Screw Amps | 22 | 22 |
| Feeder RPM | 575 | 510 |
| Rate, Kilograms/hr | 123.5 | 109 |
| Product Appearance | Good | Yellow |
| Impact, ft., 72° C. | | 3 |
| 4 lb. Tup | | |
| 10 lb. Tup | 9 | — |

The glycerin-containing, mass-polymerized PVC powder composition of this invention extruded faster than that incorporating a known antistat and further provided more heat-stable products of significantly improved impact strength.

What is claimed is:

1. In a method for preparing a filled, rigid poly(vinyl chloride) resin powder composition adapted for extrusion processing which consists essentially of blending together a particulate mass-polymerized poly(vinyl chloride) resin having an inherent viscosity of 0.7 to about 1.0 and a bulk density ranging from about 0.50 to 0.62 g/cc, from 85 to 95 percent of said resin particles being retained on 100 and 140 mesh sieves, and based on the weight of the resin, from 0.2 to 3.0 percent of a heat stabilizer therefor, from 0.1 to 5 percent of nonresinous lubricant, from 0 to 5 percent of resinous processing aid, from about 2 to 35 percent of filler and from 0.1 to 3 percent pigment until the temperature of the blending mixture attains a maximum temperature of 210°-280° F., the improvement which consists of incorporating into said blended composition from about 0.1 to 0.5 part glycerin per each 100 parts resin, by weight, whereby a filled, rigid mass-polymerized poly(vinyl chloride) resin powder composition exhibiting minimum buildup in the mixing equipment and commercially acceptable processing characteristics is produced.

2. The process of claim 1 wherein the filler is calcium carbonate.

3. The process of claim 1 wherein from 5 to 25 percent filler is employed, based on the weight of the resin.

4. The process of claim 1 wherein the glycerin is added to the resin at the start of the mixing cycle.

5. The process of claim 1 wherein the glycerin is employed in undiluted form.

6. The process of claim 1 wherein the glycerin is employed in admixture with equal parts of water, by weight.

7. The process of claim 1 wherein the maximum temperature attained by the blended mixture prior to discharge from the mixing chamber is 220°-250° F.

* * * * *